D. J. SANDHAM.
STEERING DEVICE FOR MOTOR VEHICLES.
APPLICATION FILED NOV. 28, 1913.
1,166,389.
Patented Dec. 28, 1915.
2 SHEETS—SHEET 1.
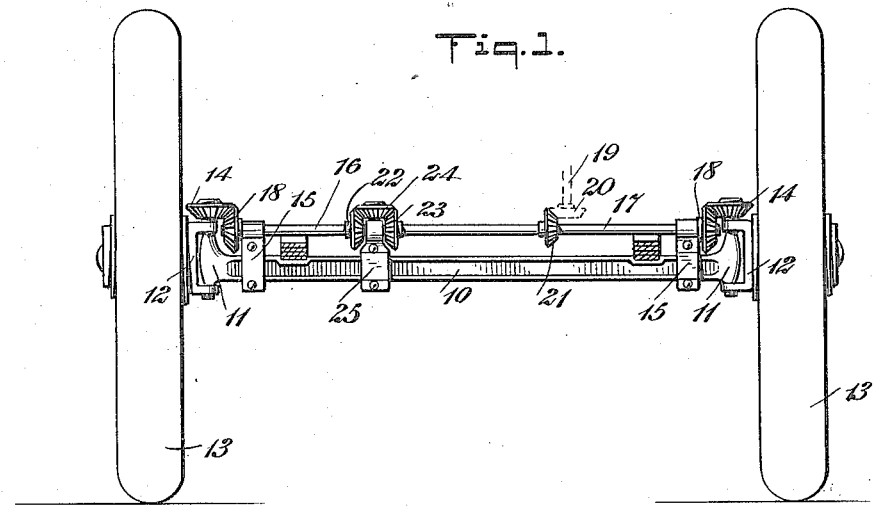
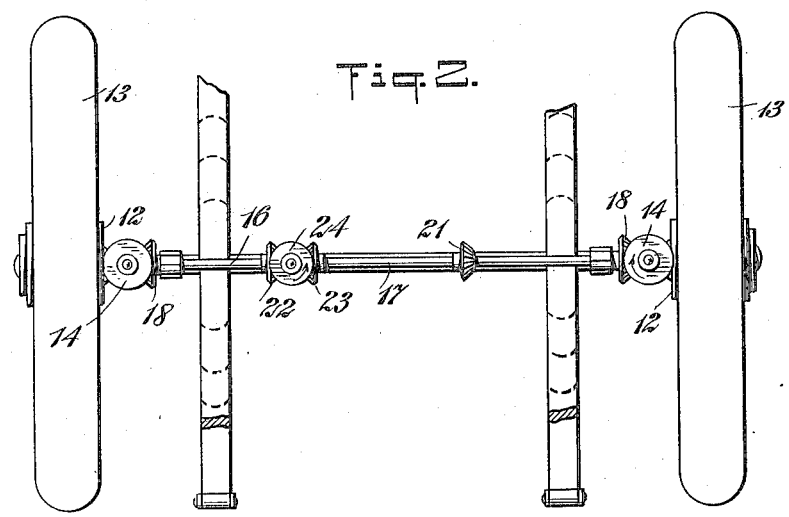
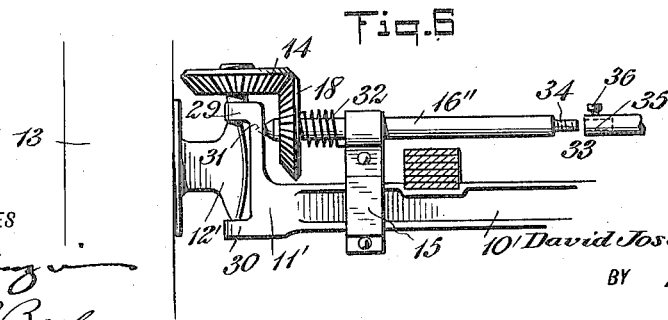
WITNESSES
INVENTOR
David Joseph Sandham
BY
ATTORNEYS D. J. SANDHAM.
STEERING DEVICE FOR MOTOR VEHICLES.
APPLICATION FILED NOV. 28, 1913.
1,166,389.  Patented Dec. 28, 1915.
2 SHEETS—SHEET 2.
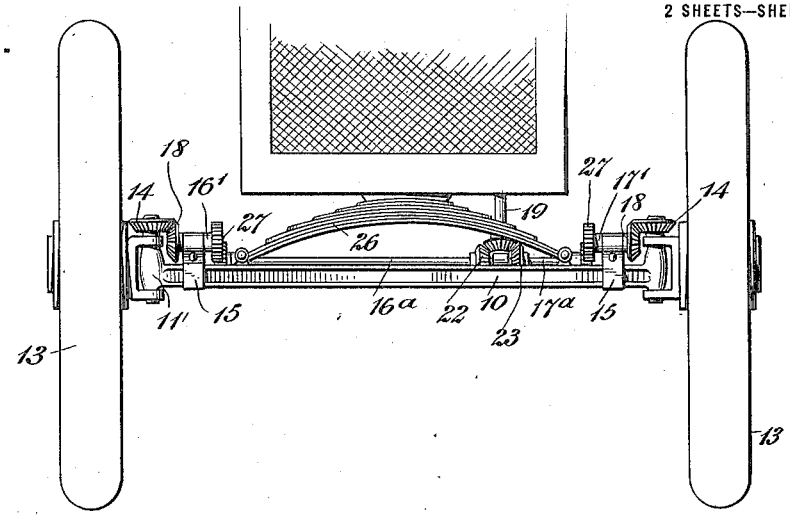
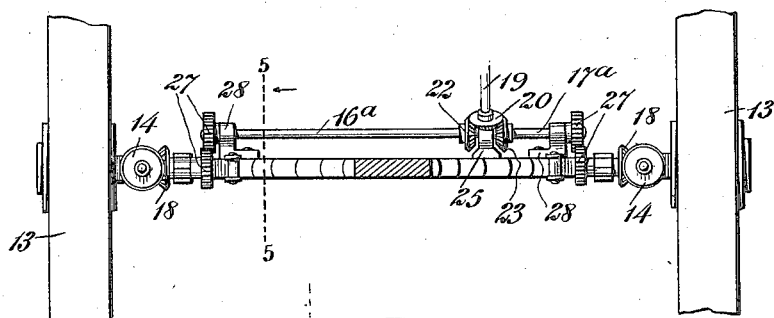
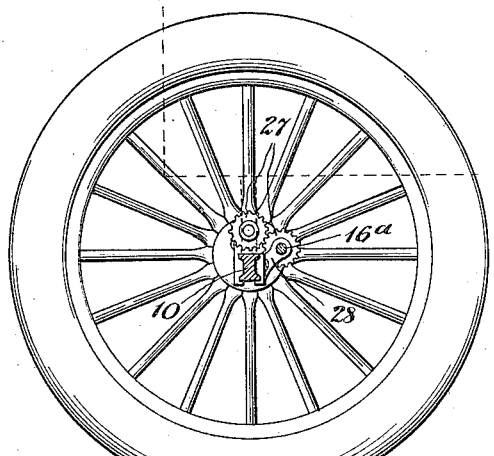
WITNESSES
INVENTOR
David Joseph Sandham
BY
ATTORNEYS

UNITED STATES PATENT OFFICE.

DAVID JOSEPH SANDHAM, OF NEW YORK, N. Y.

STEERING DEVICE FOR MOTOR-VEHICLES.

1,166,389.   Specification of Letters Patent.   Patented Dec. 28, 1915.

Application filed November 28, 1913. Serial No. 803,540.

*To all whom it may concern:*

Be it known that I, DAVID JOSEPH SANDHAM, a citizen of the United States, and a resident of the city of New York, borough of Manhattan, in the county and State of New York, have invented a new and Improved Steering Device for Motor-Vehicles, of which the following is a full, clear, and exact description.

This invention relates to carriages and wagons and has particular reference to steering devices for automobiles or other vehicles.

Among the objects of the invention is to provide a steering device of substantially universal application to all known types of vehicles; that is to say, my steering devices are adapted to be readily applied by any mechanic to practically any vehicle running gear now in use or type of vehicles now being made. The universality of application of the improvement to known vehicles is emphasized furthermore by the facility with which I may apply the steering shaft or hand mechanism to the main portions thereof irrespective of the type of vehicle or shape of the body thereof.

The foregoing and other objects of the invention will hereinafter be more fully described and claimed and illustrated in the drawings forming a part of this specification in which like characters of reference indicate corresponding parts in all the views, and in which—

Figure 1 is a front elevation of a vehicle axle and the steering knuckles and wheels connected thereto, and showing one form of my invention in operative position; Fig. 2 is a plan view of the mechanism of Fig. 1; Fig. 3 is a front elevation of a different type of automobile from that of Fig. 1, and with my improvement slightly modified in form as applicable thereto; Fig. 4 is a plan view of the device shown in Fig. 3; Fig. 5 is a vertical section on the line 5—5 of Fig. 4; and Fig. 6 is a detail in front elevation showing a slightly further modification of my invention.

Referring more particularly to the drawings, I show at 10 a vehicle axle of any suitable form or construction, to the heads 11 of which are pivoted any usual or well known form of steering knuckles 12 on vertical axes, and to said knuckles are connected supporting wheels 13.

By my improvement I dispense with the arms which usually extend forwardly from the upper portions of the steering knuckles, and in lieu thereof I connect, in any suitable rigid manner to the upper end of each steering knuckle, a gear 14 of any suitable type, but shown herein as a bevel gear. A pair of brackets 15, or hangers, constructed in a manner to conform to the axle 10, are clamped thereto not far from the heads 11, and said brackets constitute bearing supports for shaft elements 16 and 17, each having at its outer end a bevel gear 18 meshing with the aforesaid gear 14. Said shaft elements 16 and 17 are adapted to be controlled as to rotation preferably in opposite directions by any suitable mechanism including a steering post 19 which may be of any suitable length and adapted to extend in any desired direction within reach of the operator of the vehicle. Said steering post 19 has at its lower end a gear 20 of any suitable form, shown herein as a bevel gear, and adapted to control the operation of said shaft elements 16 and 17 either directly or indirectly according to the type of vehicle to which my improvement may be attached. As shown in Figs. 1 and 2, said gear 20 is in mesh with the corresponding gear 21 secured adjustably at any desired position along either of the elements 16 and 17, for instance, as shown in Figs. 1 and 2, to the element 17 substantially midway of its ends. The rotation of one shaft element with respect to the other is determined by any suitable direction changing devices such as gears 22 and 23 connected respectively to the elements 16 and 17 and having an idler 24 between them. This device may be supported in any suitable manner upon a bracket or hanger 25 carried by the axle 10. It will follow, therefore, that both steering knuckles and wheels will be caused to be turned laterally simultaneously in the direction corresponding to the direction of rotation of the steering post 19, conforming in this respect to the usual practice. Instead of using the gear 21, I may connect the steering post, or any suitable shaft serving its purpose, directly to one of the members of the direction changing gearing supported on the bracket 25, as shown in Figs. 3 and 4, or, in some instances the steering shaft might be connected to any other moving part of the device.

Referring again to Figs. 3 and 4 which illustrate a different type of automobile, one in which a spring is mounted directly above the front axle, the shaft elements 16' and 17' which have direct gearing connection through the steering knuckle gears 14 are of a different character specifically from the corresponding shafts above described, being shorter and operated from a countershaft composed of elements 16ª and 17ª. These last mentioned elements are connected by a reversing device including gears 22 and 23 connected by any intermediate gear as above described. The shaft elements 16ª and 17ª, as shown best in Fig. 4, operate in a position parallel to but at one side of the vertical plane of the axle 10 and vehicle spring 26, and said elements are connected to the first mentioned shaft elements in any suitable manner as, for instance, by means of pairs of spur gears 27. The shaft elements 16ª and 17ª furthermore are supported upon hangers or brackets 28 secured in any suitable manner to the axle 10.

In Fig. 6 is shown an adaptation of the device having a number of distinct advantages including the following: The gear 14, as before described, is connected to the steering knuckle 12' and is controlled in its rotation by a gear 18' connected to a shaft element 16''. The axle head 11' in this instance provides two spaced bearings 29 and 30 for the knuckle, and on its inner face, adjacent the upper bearing 29, is provided a conical socket 31 into which is fitted the conical bearing end of the shaft 16''. By this means the bracket 15 carried by the axle 10' is relieved of a large amount of lateral or torsional bearing of the shaft 16'' due to its normal operations. It will be understood also that either or both of the shaft elements controlling the position or rotation of the steering knuckles may be provided with the features of construction shown in this figure. Again, I prefer to use a coil spring 32 surrounding said shaft element and having one end secured to the gear 18' and its opposite end clamped between the members of the hanger 15. The spring 32 may be adjusted for any suitable torsional tension, and acting both torsionally and longitudinally, serves two purposes; first, to prevent any rattling which might take place between the gears when the steering post is in its neutral position, and secondly, to keep the shaft securely seated in the bearing socket 31 and the gear 18' in mesh with the gear 14. To compensate for any wear which may take place, and also to assist in the adjustment of the parts, the shaft element may be provided with an adjustment, such as is shown at 33, comprising a threaded pin 34 having adjustable engagement with a threaded socket 35. When the shaft elements are adjusted, the two parts may be clamped together in fixed position by means of a set screw 36.

Having thus described my invention, I claim as new and desire to secure by Letters Patent:—

1. In a steering device of the character set forth, the combination of an axle having a head, a steering knuckle pivoted to said head on a vertical axis, a shaft element supported upon the axle and substantially parallel thereto, a gear connected to the knuckle, a gear connected to the shaft element and meshing with said knuckle gear, the end of said shaft element being journaled in a bearing in the head of the axle, and means to adjust the shaft element longitudinally and maintain it in said end bearing.

2. In a steering device, the combination of an axle having a head, a steering knuckle pivoted upon said head, a shaft element adjacent the axle, a two-part hanger connected to the axle and supporting said shaft element, gear connections between the knuckle and the shaft element, and a spring having one end connected between the parts of the said hanger and serving at its other end to maintain said gear connections in proper mesh.

In testimony whereof I have signed my name to this specification in the presence of two subscribing witnesses.

DAVID JOSEPH SANDHAM.

Witnesses:
GEO. L. BEELER,
PHILIP D. ROLLHAUS.

Copies of this patent may be obtained for five cents each, by addressing the "Commissioner of Patents, Washington, D. C."